Patented Sept. 7, 1948

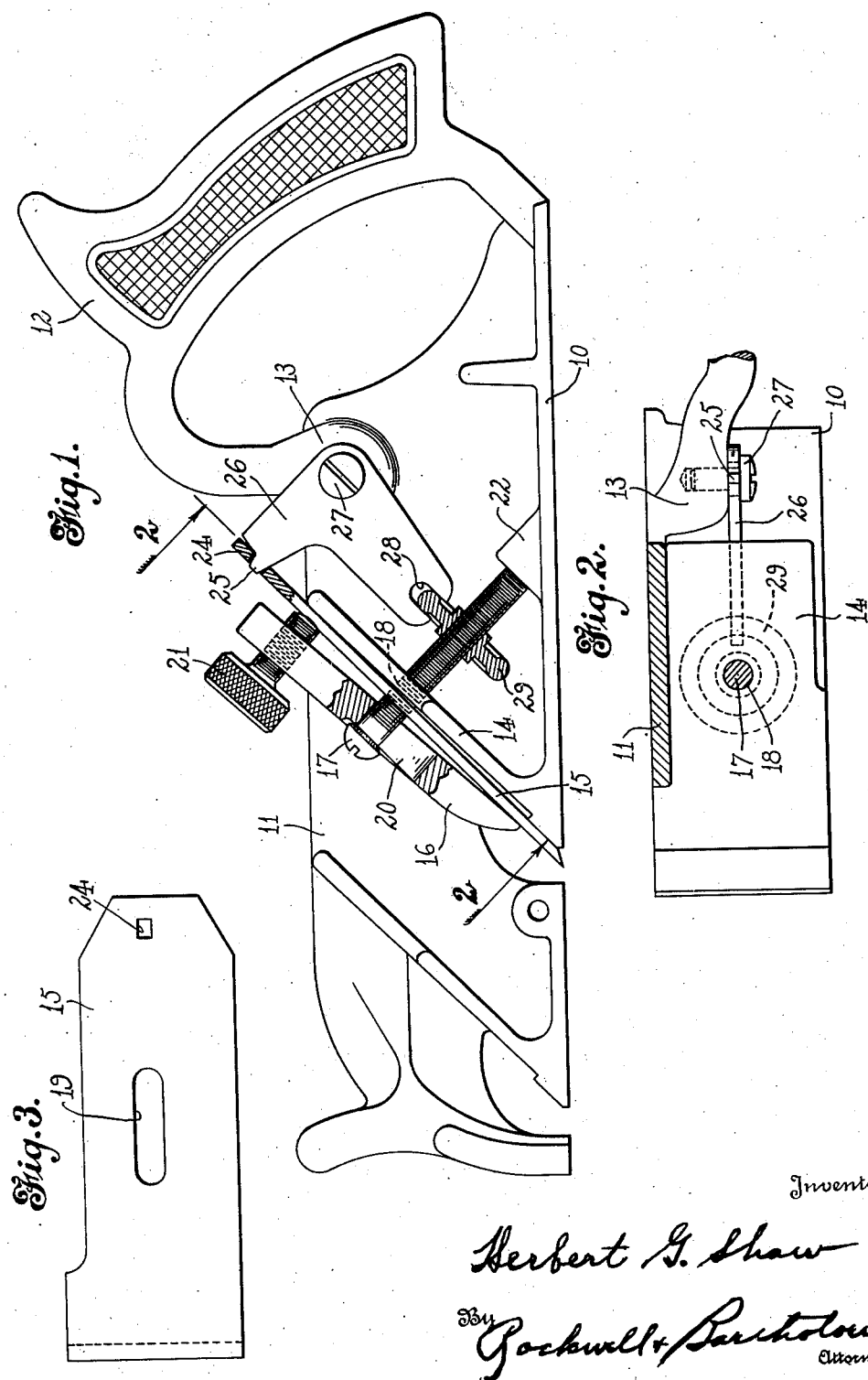

2,449,015

UNITED STATES PATENT OFFICE 2,449,015

RABBET PLANE

Herbert G. Shaw, Derby, Conn., assignor to Sargent & Company, New Haven, Conn., a corporation of Connecticut Application September 7, 1945, Serial No. 614,867

7 Claims. (Cl. 145—13)

1

This invention relates to planes, and more particularly to what is termed a rabbet plane in which the cutter extends to or slightly beyond the sides of the plane in order that a rabbet may be cut by the bit without jamming on the sides.

In the use of carpenter's planes of various kinds, it is desirable to have a blade adjustment to adjust the depth of cut by varying the amount of projection of the blade below the bottom of the plane. It is also desirable that this adjustment be relatively fine so that the user of the plane may make a close adjustment to remove as much material as is desirable in a stroke of the plane, and yet not set the blade so deep that a chip of excessive thickness will be cut. Moreover, it is also desirable that the adjusting devices be located where they are conveniently accessible, and that the tool may be economically manufactured.

In a rabbet plane, it is quite customary for the body of the plane to be provided with only one upstanding side wall which renders easy access to the space below the frog of the plane, so that the adjusting device, if placed below this frog, may be readily accessible. I have taken advantage of this feature of a rabbet plane and located the adjusting nut below the frog, making use of the frog screw, or the screw that secures the clamping plate to the frog, to threadedly mount the adjusting nut, thus achieving an economy in manufacture.

One object of the invention is to provide a rabbet plane of improved construction which may be economically manufactured.

A further object of the invention is to provide a rabbet plane employing a bell-crank lever to effect adjustment of the blade for depth of cut, one end of the bell-crank lever being connected to the blade itself and the other end being operatively connected with an adjusting nut mounted upon the clamp screw which secures the clamping blade to the rabbet.

A still further object of the invention is to provide a rabbet plane employing a bell-crank lever to adjust the blade for depth of cut, which bell-crank lever will be pivoted in a novel manner to the body of the plane and which will be operated by an adjusting nut also mounted in a novel and convenient manner to render the plane economical to manufacture.

To these and other ends the invention consists in the novel features and combinations of parts to be hereinafter described and claimed.

In the accompanying drawings:

Fig. 1 is a side elevational view of a rabbet plane embodying my invention;

2

Fig. 2 is a sectional view on line 2—2 of Fig. 1, the section being taken below the blade and above the frog; and Fig. 3 is a top plan view of the blade of the plane.

To illustrate a preferred embodiment of my invention, I have shown a rabbet plane comprising a body consisting of a bottom plate 10, a side wall 11 and a handle 12. These members may, as illustrated, be integrally formed, the upper end of the handle joining the side wall 11 by a boss 13 which projects horizontally from this side wall. Also integrally formed in this instance with the body of the plane is the usual frog 14 upon which the blade 15 is slidably mounted.

The blade is held in place by a clamping member or plate 16, this plate being secured by a screw 17 threaded into the frog at 18. This screw passes through an elongated slot 19 in the blade, so that the latter may be adjusted for depth of cut with respect to the screw, and the screw also passes through a slot of key-holed shape 20 in the clamping plate, the head of the screw being sufficiently wide to overhang the edges of the smaller part of this slot so as to hold the plate in place. A set screw 21 is also threaded into the clamping plate 16, the lower end of this screw bearing against the blade so as to force the lower end of the clamping plate into contact with the blade in the usual manner in order to clamp the blade tightly against the frog.

It will be noted that the screw 17 not only passes through the frog but is continued in length, so that at its lower end, it is seated against a boss 22 formed upon the bottom member 10 of the plane so that the position of this screw will ordinarily be fixed as it is threaded into the frog to such an extent that its lower end bears firmly against this boss.

As shown in Figs. 1 and 3, the blade 15 is provided with an opening 24 adjacent its upper end, in which opening rests a finger 25 formed upon one arm of a bell-crank lever 26. This lever is pivoted upon a screw 27 secured in the boss 13 of the handle, so that the lever may oscillate about this pivot. By employing this boss to support the pivot screw 27 economy in manufacture is achieved as a separate member does not have to be provided to receive the screw.

The other arm of the bell-crank lever 26 is provided with a slot 28 in which is received a circular adjusting nut 29, this nut being threaded upon that portion of the screw 17 which lies between the frog 14 and the boss 22. It will be seen that the screw 17 is thus made to serve a double purpose. That is, it not only secures the clamping plate 16 to the frog, but also serves as an adjustable mounting for the nut 29.

Moreover, it will be apparent that while the adjusting nut 29 is mounted below the frog, it will still be readily accessible for manipulation as the plane is provided with only one upstanding side wall 11 as is often the custom with planes employed for rabbeting operations. Moreover, a very fine adjustment of the blade or bit may be achieved and, as the connections between the adjusting nut and blade consist of a single member, i. e. the bell-crank lever 26, very little lost motion will be present between the parts, and the blade will be effectively retained in a predetermined position of adjustment.

While I have shown and described a preferred embodiment of my invention, it will be understood that it is not to be limited to all of the details shown, but is capable of modification and variation within the spirit of the invention and within the scope of the claims.

What I claim is:

1. A plane comprising a body, a frog, a blade, and a clamp plate, a screw securing said plate to the frog and projecting through the latter, a nut threadedly mounted on said screw, and a lever connecting the nut with the blade to adjust longitudinally the position of the latter with respect to the frog upon rotation of the nut.

2. A plane comprising a body, a frog, a blade, and a clamp plate, means for adjusting said blade longitudinally with respect to the frog comprising a nut and means operatively connecting said nut to the blade, and common means for mouning said nut and securing said clamp plate to the frog, said last-named means comprising a screw threaded into the frog and projecting from the rear face thereof to provide a threaded mounting for the nut and engage with the clamp plate forwardly of the frog.

3. A plane comprising a body, a frog, a blade, and a clamp plate, a screw securing said plate to the frog and projecting through the latter, a nut threadedly mounted on said screw, means connecting the nut with the blade to adjust the position of the latter longitudinally of the frog upon rotation of the nut, and a handle, said connecting means comprising a bell crank lever pivoted on the handle.

4. A plane comprising a body, a frog, a blade, and a clamp plate, a screw engaged with the plate and threaded into said frog, said screw having a threaded portion extending rearwardly of the frog, a nut mounted on said portion, and means operatively connecting said nut with the blade for effecting longitudinal adjustment of the latter with respect to the frog.

5. A plane comprising a body, a frog, a blade, and a clamp plate, a screw engaged with the plate and threaded into said frog, said screw having a threaded portion extending rearwardly of the frog, a boss on the plane body against which the extended end of said screw seats, an adjusting nut threadedly mounted on the screw between the frog and boss, and means operatively connecting said nut with the blade.

6. A plane comprising a body, a frog, a blade, and a clamp plate, a screw engaged with the plate and threaded into said frog, said screw having a threaded portion extending rearwardly of the frog, a boss on the plane body against which the extended end of said screw seats, an adjusting nut threadedly mounted on the screw between the frog and boss, and means operatively connecting said nut with the blade, said means comprising a lever pivotally mounted on the plane body.

7. A plane comprising a body, a frog, a blade, and a clamp plate, a screw engaged with the plate and threaded into said frog, said screw having a threaded portion extending rearwardly of the frog, a boss on the plane body against which the extended end of said screw seat, an adjusting nut threadedly mounted on the screw between the frog and boss, means operatively connecting said nut with the blade, and a handle secured to the body, said means comprising a lever pivoted on the handle.

HERBERT G. SHAW.

REFERENCES CITED

The following references are of record in the file of this patent:

UNITED STATES PATENTS

| Number | Name | Date |
| --- | --- | --- |
| 703,158 | Stanley et al. | June 24, 1902 |
| 871,001 | Smith | Nov. 12, 1907 |
| 1,048,455 | Burdick | Dec. 24, 1912 |
| 1,645,781 | Szako | Oct. 18, 1927 |